(12) United States Patent
Kim

(10) Patent No.: US 12,179,638 B2
(45) Date of Patent: Dec. 31, 2024

(54) VEHICLE SEAT RAIL

(71) Applicant: DAS CO., LTD, Gyeongju-si (KR)

(72) Inventor: Ki Hong Kim, Yongin-si (KR)

(73) Assignee: DAS CO., LTD., Gyeongju-si (KR)

( * ) Notice: Subject to any disclaimer, the term of this patent is extended or adjusted under 35 U.S.C. 154(b) by 0 days.

(21) Appl. No.: 18/150,913

(22) Filed: Jan. 6, 2023

(65) Prior Publication Data

US 2024/0092229 A1    Mar. 21, 2024

(30) Foreign Application Priority Data

Sep. 21, 2022  (KR) .................. 10-2022-0119170

(51) Int. Cl.
*B60N 2/07* (2006.01)

(52) U.S. Cl.
CPC ........... *B60N 2/0722* (2013.01); *B60N 2/072* (2013.01)

(58) Field of Classification Search
CPC .... B60N 2/0722; B60N 2/0717; B60N 2/072; B60N 2/0727; B60N 2/0732; B60N 2/0818; B60N 2205/30
USPC ....................... 248/424, 429, 430
See application file for complete search history.

(56) References Cited

U.S. PATENT DOCUMENTS

| | | | |
|---|---|---|---|
| 1,726,597 A * | 9/1929 | Templeton | B60N 2/0818 248/430 |
| 1,979,860 A * | 11/1934 | Browne | B60N 2/0825 248/430 |
| 2,579,599 A * | 12/1951 | Moroney | B60N 2/0825 297/344.14 |
| 2,681,687 A * | 6/1954 | Haltenberger | B60N 2/071 248/425 |
| 3,022,976 A * | 2/1962 | Zia | B60N 2/4221 296/68.1 |
| 3,100,617 A * | 8/1963 | Radke | B60N 2/544 248/430 |

(Continued)

FOREIGN PATENT DOCUMENTS

| | | | |
|---|---|---|---|
| CN | 105774603 A * | 7/2016 | ........... B60N 2/0722 |
| DE | 10152556 C1 | 10/2002 | |

(Continued)

OTHER PUBLICATIONS

Office Action issued in connection with German patent application No. 10 2023 200 413.5 dated Feb. 23, 2023.

(Continued)

*Primary Examiner* — Jonathan Liu
*Assistant Examiner* — Guang H Guan
(74) *Attorney, Agent, or Firm* — Tarolli, Sundheim, Covell & Tummino LLP

(57) ABSTRACT

The present disclosure relates to a vehicle seat rail. The vehicle seat rail includes a lower rail fixed to a bottom of a vehicle, an upper rail fixed to a seat at an upper portion thereof and coupled to the lower rail to be slidably movable, a restoring spring fixedly coupled to the lower rail at one end thereof in a longitudinal direction and configured to provide a restoring force to the upper rail, and a connection bracket configured to connect the restoring spring to the upper rail. The lower rail may accommodate the restoring spring and the connection bracket to implement a walk-in function even when the lower rail is buried in the floor.

7 Claims, 8 Drawing Sheets

(56) References Cited

U.S. PATENT DOCUMENTS

| | | | | |
|---|---|---|---|---|
| 3,841,696 A * | 10/1974 | Wagner | ................ | B60N 2/1675 |
| | | | | 296/65.13 |
| 4,101,169 A * | 7/1978 | Muraishi | ................ | B60N 2/123 |
| | | | | 297/341 |
| 5,344,204 A * | 9/1994 | Liu, Yunzhao | .... | B60N 2/42736 |
| | | | | 296/68.1 |
| 5,597,206 A * | 1/1997 | Ainsworth | ........... | B60N 2/0705 |
| | | | | 297/378.12 |
| 6,224,131 B1 * | 5/2001 | Shammout | ........... | B60N 2/4221 |
| | | | | 296/68.1 |
| 6,299,121 B1 * | 10/2001 | Brault | ................ | B60N 2/01508 |
| | | | | 297/341 |
| 6,499,712 B1 * | 12/2002 | Clark | .................... | B60N 2/072 |
| | | | | 248/424 |
| 6,511,032 B1 * | 1/2003 | Lee | ...................... | B60N 2/0725 |
| | | | | 296/65.13 |
| 6,830,296 B2 * | 12/2004 | Kojima | ................ | B60N 2/0715 |
| | | | | 297/341 |
| 7,293,836 B2 * | 11/2007 | Browne | ............... | B60N 2/4228 |
| | | | | 297/344.11 |
| 7,350,844 B2 | 4/2008 | Nemoto | | |
| 7,566,098 B2 * | 7/2009 | Na | ....................... | B60N 2/0722 |
| | | | | 297/341 |
| 7,654,602 B2 * | 2/2010 | Smiley | .................. | B66F 9/0759 |
| | | | | 297/14 |
| 10,549,655 B2 * | 2/2020 | Sasaki | .................. | B60N 2/0715 |
| 11,685,297 B2 * | 6/2023 | Huf | ...................... | B60N 2/4214 |
| | | | | 296/68.1 |
| 2023/0158924 A1 * | 5/2023 | Amstein | ................ | B60N 2/067 |
| | | | | 248/429 |
| 2024/0092229 A1 * | 3/2024 | Kim | ........................ | B60N 2/12 |

FOREIGN PATENT DOCUMENTS

| | | |
|---|---|---|
| DE | 102005058741 A1 | 5/2007 |
| DE | 102016107306 A1 | 10/2017 |
| JP | 2020199970 A | 12/2020 |
| KR | 2019980037899 | 9/1998 |

OTHER PUBLICATIONS

Korean Office Action for KR application No. 10-2022-0119170, dated Jul. 30, 2024, 5 pages.

* cited by examiner

[FIG. 1]
[PRIOR ART]
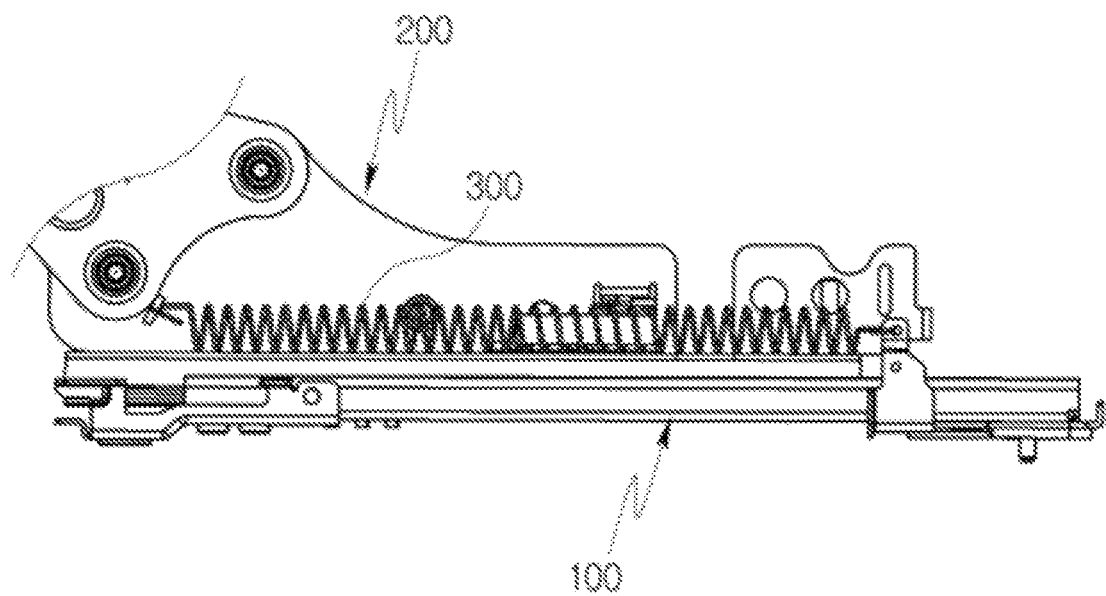

[FIG. 2]
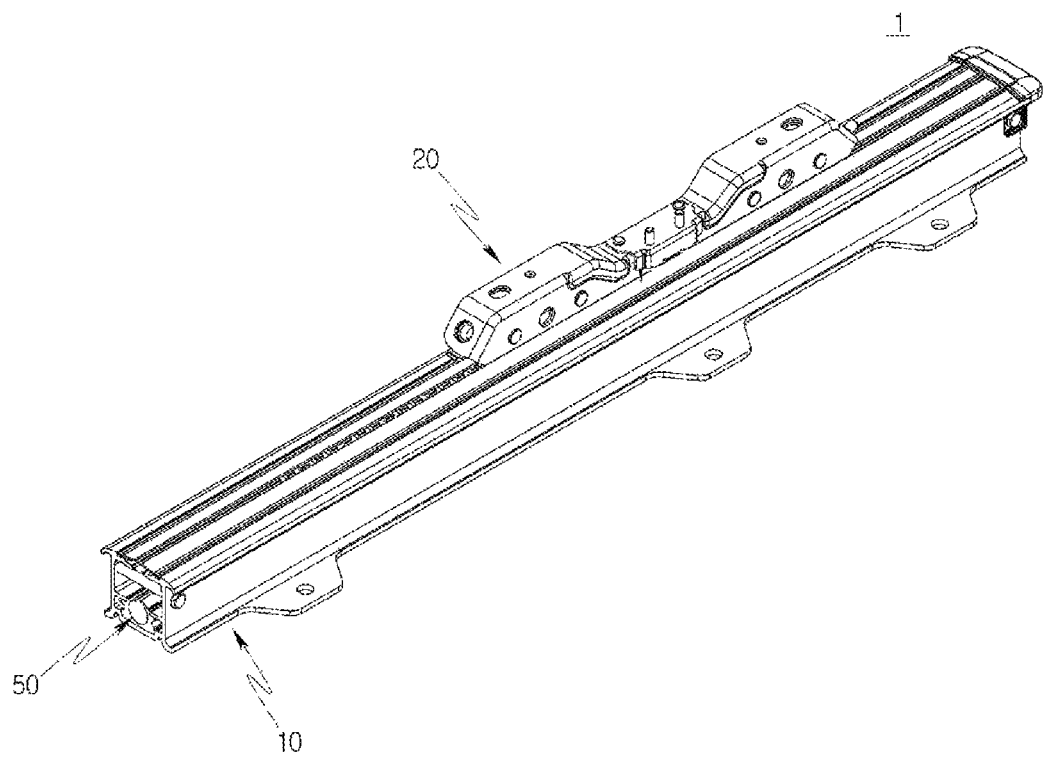

[FIG. 3]
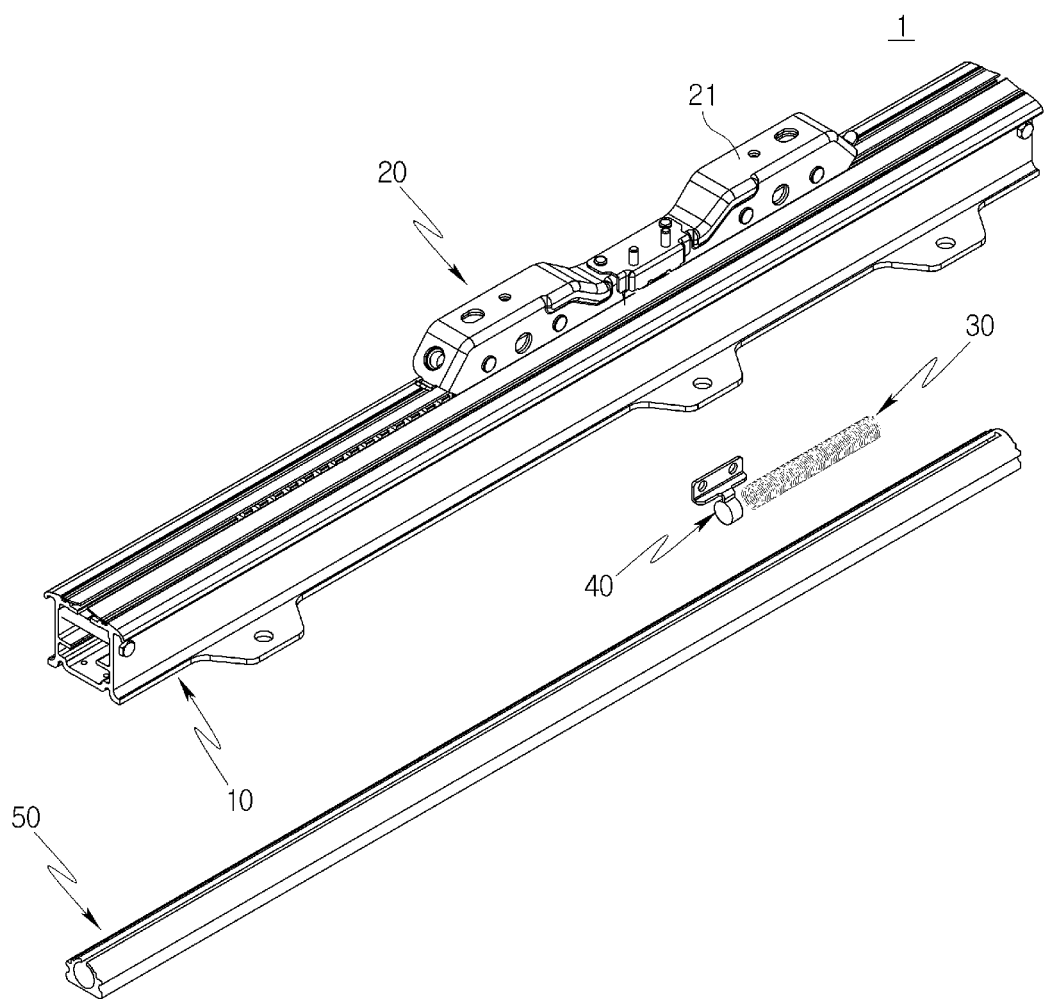

[FIG. 4]
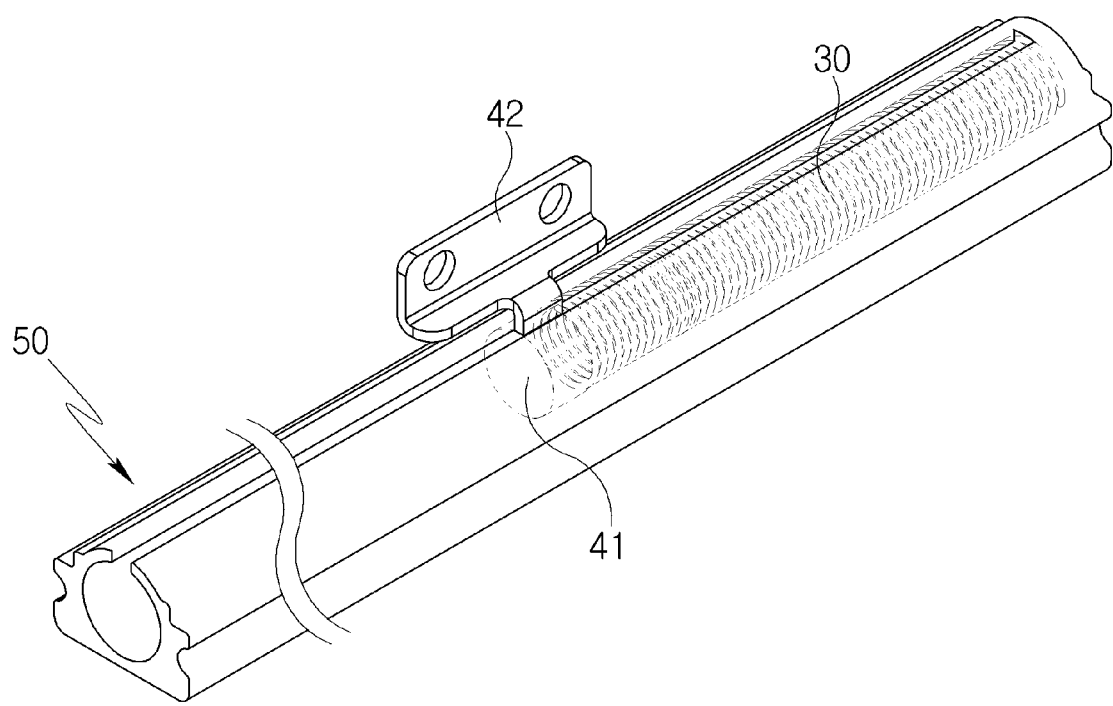

[FIG. 5]
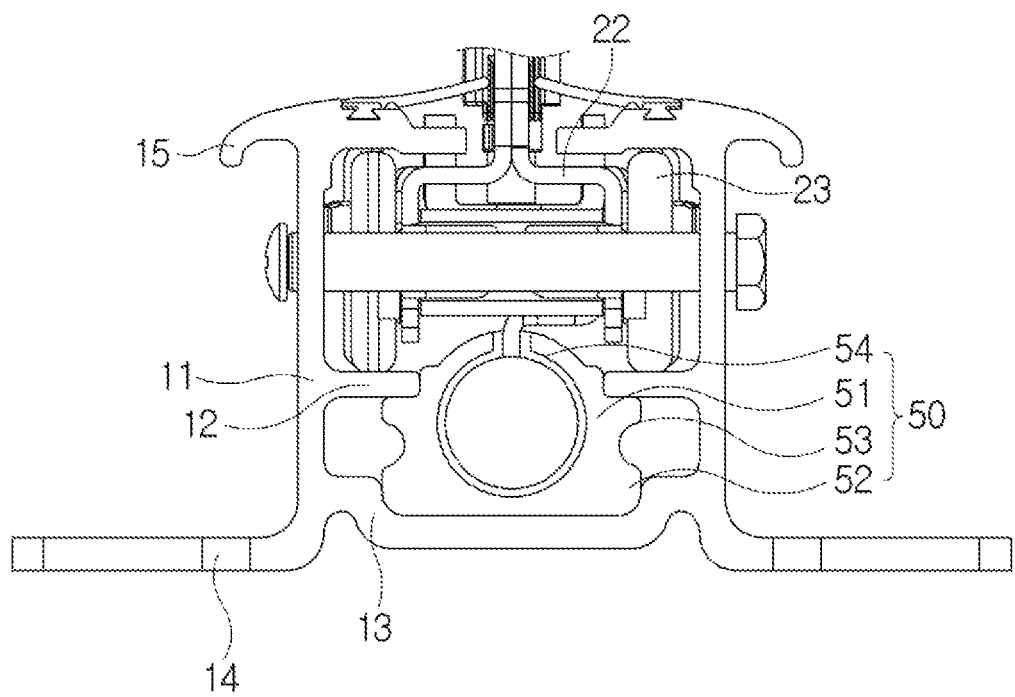

[FIG. 6]
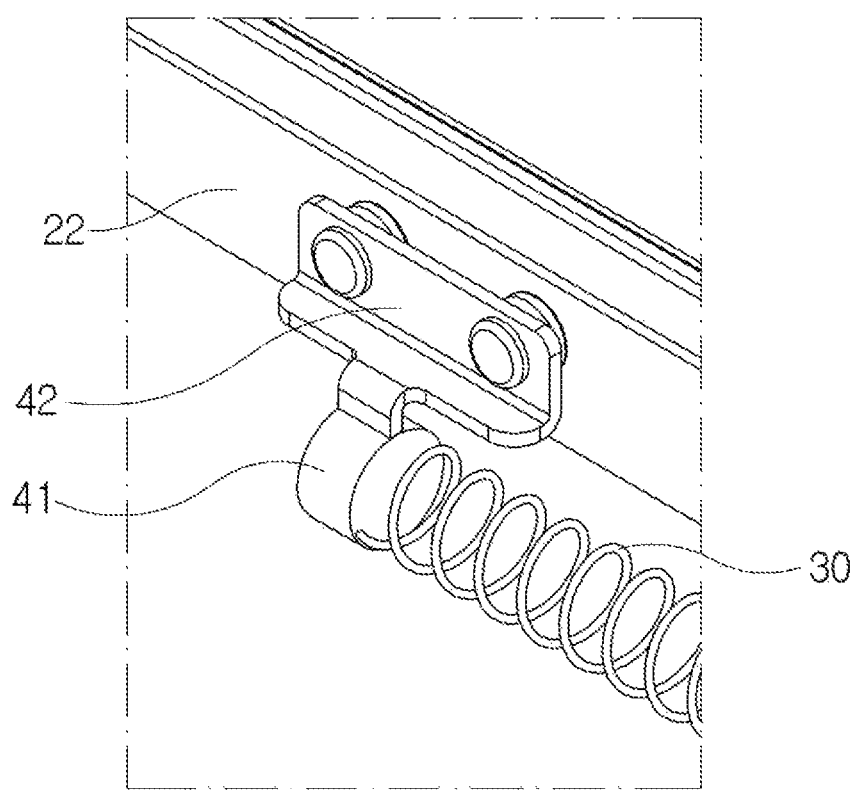

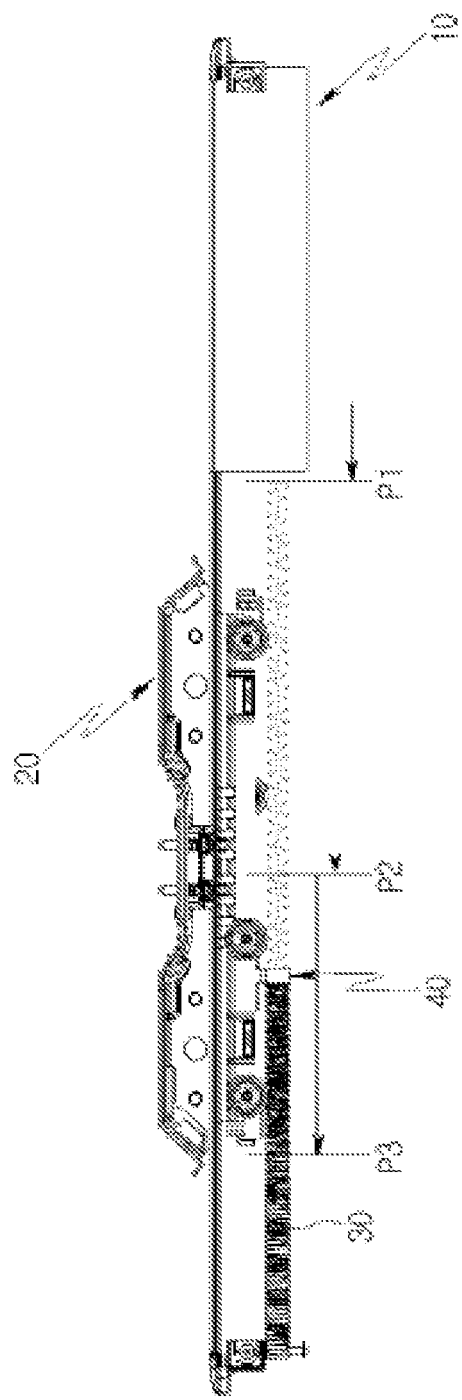
[FIG. 7]

[FIG. 8]
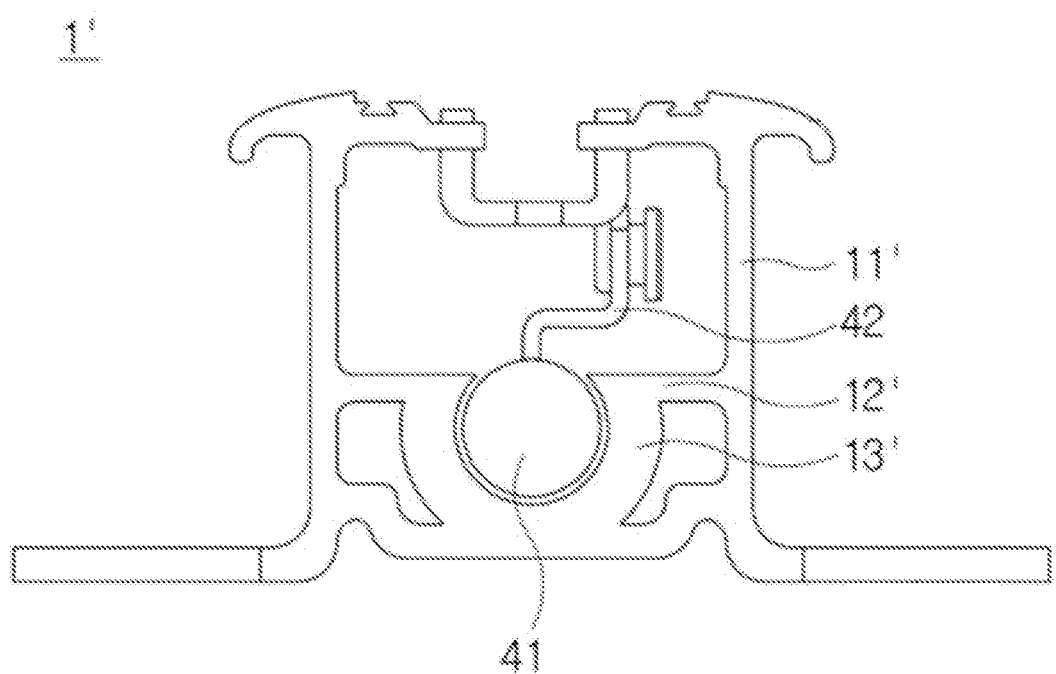

VEHICLE SEAT RAIL

CROSS REFERENCE TO RELATED APPLICATION

The present application claims priority to Korean Patent Application No. 10-2022-0119170, filed Sep. 21, 2022, the entire contents of which is incorporated herein for all purposes by this reference.

BACKGROUND

Field

The present disclosure relates to a vehicle seat rail, and more particularly, to a long rail type vehicle seat rail that implements a walk-in function.

Description of the Related Art

In general, a seat for a vehicle includes a seat cushion slidably installed back and forth on the floor of a room to support a load of an occupant, and a seat back rotatably installed to the seat cushion to support the back of the occupant.

The seat includes a device for locking a seat rail for movably coupling the seat to the floor of the vehicle in order for a driver or passenger to adjust the position of the seat by pulling or pushing the seat forward and backward to suit her or his body shape, and a recliner for adjusting the angle of the seat back with respect to the seat cushion.

On the other hand, in recent years, in order to facilitate boarding of third-row occupants in a three-row vehicle, the second-row seat is slid forward to widen an open area for a door. In particular, space expansion is maximized by folding the seatback along with sliding of the seat. The sliding of the front seat is called a walk-in function.

In a conventional seat having the walk-in function as described above, when an occupant operates a walk-in lever mounted on a seatback, a walk-in cable is pulled to operate a recliner device, and the seatback is folded forward by the operation of the recliner device. In this case, while a walk-in bracket is rotated by a communication bracket of the seatback, a sliding cable is pulled to release a locking lever of the seat rail. Then, the seat is in a slidable state in the front and rear directions of the vehicle. In this case, an occupant pushes the seat in the front direction of the vehicle and then gets on the rear seat.

When the seat having the walk-in function as described above, which has been slid forward and walked-in, is moved to its original position in order for a passenger to board the walk-in seat after the walk-in operation, the position of the seat which has been adjusted to fit the body shape of the occupant before the walk-in operation is in an initialization position.

As shown in FIG. 1, a restoring spring 300 for applying a restoring force to move the seat to a forward position is provided between a lower rail 100 fixed to the floor of the vehicle and an upper rail 200 slidably coupled to the lower rail 100. One end of the restoring spring 300 is fixed to the lower rail 100 and the other end is fixed to the upper rail 200. In this case, a compression spring is exposed to the outside of the lower rail.

On the other hand, in the case of a general car, a short rail is used to adjust the front and rear positions of a driver seat and a passenger seat. In the case of an SUV or van type vehicle, a long rail is applied to seats in the second or more rows to secure a large amount of forward and backward movement, enabling adjustment of more diverse seat positions.

Since the lower rail is deeply buried in the floor in a long rail type seat, there is a limit in that there is no space for coupling the restoring spring to the lower rail.

SUMMARY

In order to resolve the above problems caused by the conventional vehicle seat rail as described above, the present disclosure provides a vehicle seat rail capable of implementing a walk-in function by coupling a restoring spring to a lower rail even when the lower rail is buried in the floor.

According to the present disclosure, a vehicle seat rail includes a lower rail fixed to a bottom of a vehicle, an upper rail fixed to a seat at an upper portion thereof and coupled to the lower rail to be slidably movable, a restoring spring fixedly coupled to the lower rail at one end thereof in a longitudinal direction and configured to provide a restoring force to the upper rail, and a connection bracket configured to connect the restoring spring to the upper rail, and the lower rail may accommodate the restoring spring and the connection bracket therein.

In this case, the lower rail may include a hallow lower rail body, and a pair of rail frames protruding from an inner surface of the lower rail body in the longitudinal direction to face each other, and at least a portion of the connection bracket may be disposed between the pair of rail frames.

The vehicle seat rail may further include a spring guide coupled to an inside of the lower rail and configured to accommodate the connection bracket therein.

The connection bracket may include a piston portion in contact with one end of the restoring spring in a longitudinal direction; and a rail coupling portion connected to the piston portion and fixedly coupled to the upper rail.

The lower rail may include a lower rail body configured to accommodate wheels of the upper rail therein, and a spring guide groove formed in an inside of the lower rail body and configured to moveably accommodate the connection bracket and the restoring spring.

As described above, according to the vehicle seat rail according to the present disclosure, the restoring spring is accommodated in the inner space of the lower rail, and the restoring spring is coupled to the upper rail in the inner space of the lower rail, thus implementing the walk-in function even when the lower rail is buried in the floor.

BRIEF DESCRIPTION OF THE DRAWINGS

FIG. 1 is a view for describing a conventional vehicle seat rail;

FIG. 2 is a perspective view for describing a vehicle seat rail according to an embodiment of the present disclosure;

FIG. 3 is an exploded perspective view of FIG. 1;

FIG. 4 is a view for describing a state in which a connection bracket and a restoring spring are accommodated in a spring guide in FIG. 1;

FIG. 5 is a front view of FIG. 1;

FIG. 6 is a view for describing a connection bracket in a vehicle seat rail according to an embodiment of the present disclosure;

FIG. 7 is a view for describing a process of applying a restoring force by a restoring spring; and FIG. 8 is a front view for describing a vehicle seat rail according to another embodiment of the present disclosure.

DETAILED DESCRIPTION

Hereinafter, preferred embodiments of the present disclosure will be described in detail with reference to the accompanying drawings.

Since the present disclosure can have various changes and various embodiments, specific embodiments are illustrated in the drawings and will be described in detail in the detailed description. This is not intended to limit the present disclosure to specific embodiments, and should be construed to include all modifications, equivalents, and substitutes included in the spirit and scope of the present disclosure.

In describing the present disclosure, terms such as first, second, etc. may be used to describe various components, but the components may not be limited by the terms. The terms are used merely for the purpose to distinguish a component from the other component. For example, a first component may be referred to as a second component without departing from the scope of the present disclosure, and likewise a second component may be referred to as a first component.

The term "and/or" includes any and all combination of one or more of the related listed items.

When an element is referred to as being "connected to" or "coupled with" another element, not only it can be directly connected or coupled to the other element, but also it can be understood that intervening elements may be present. In contrast, when an element is referred to as being "directly connected to" or "directly coupled with" another element, there are no intervening elements present. The terminology used herein is for the purpose of describing particular embodiments only and is not intended to limit the present disclosure. As used herein, the singular forms "a," "an," and "the" are intended to include the plural forms as well, unless the context clearly indicates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the following embodiments are provided to more completely explain to those of ordinary skill in the art, and the shapes and sizes of elements in the drawings may be exaggerated for clearer explanation.

FIG. 2 is a perspective view for describing a vehicle seat rail according to an embodiment of the present disclosure, FIG. 3 is an exploded perspective view of FIG. 1, FIG. 4 is a view for describing a state in which a connection bracket and a restoring spring are accommodated in a spring guide in FIG. 1, FIG. 5 is a front view of FIG. 1, FIG. 6 is a view for describing a connection bracket in a vehicle seat rail according to an embodiment of the present disclosure, and FIG. 7 is a view for describing a process of applying a restoring force by a restoring spring.

A vehicle seat rail according to an embodiment of the present disclosure will be described with reference to FIGS. 2 to 7.

A vehicle seat rail 1 according to an embodiment of the present disclosure may include a lower rail 10, an upper rail 20, a restoring spring 30, a connection bracket 40, and a spring guide.

The lower rail 10 is fixed to the floor of a vehicle and the upper rail 20 is slidably coupled to the lower rail 10. The spring guide 50 is coupled in the inside of the lower rail 10 and the connection bracket 40 is accommodated in the spring guide 50 to be linearly movable. In this case, the connection bracket 40 is fixedly coupled to the upper rail 20, and is connected to one end of the restoring spring 30 in a longitudinal direction. On the other hand, the other end of the restoring spring 30 in the longitudinal direction is connected to the lower rail 10.

The lower rail 10 is fixed to the bottom of the vehicle to guide the slide movement of the upper rail 20.

The lower rail 10 may include a rail body 11, a rail frame 12, a guide fixing groove 13, a floor fixing portion 14, and a floor support portion 15.

The lower rail body 11 may be formed to be hollow to accommodate a part of the upper rail 20 therein. For example, the lower rail body 11 may be formed similarly to a square tube shape, and a space through which a part of upper rail 20 (a connection portion 22 to be described) is to pass may be formed in the upper portion of the lower rail body 11. The space may be formed in the longitudinal direction of the lower rail body 11. Furthermore, wheels 23 of the upper rail 20 may be accommodated in the inside of the lower rail body 11. In addition, the restoring spring 30, the connection bracket 40 and the spring guide 50 may be accommodated in the inside of the lower rail body 11.

The lower rail body 11 may be arranged in a direction parallel to the floor (not shown) of the vehicle. For example, at least a part of the lower rail body 11 of the present embodiment may be disposed to be buried in the floor.

A pair of rail frames 12 may protrude from the inner surface of the lower rail body 11 to face each other in the longitudinal direction. For example, the rail frame 12 with the square tube shape may protrude from a pair of inner walls of the lower rail body 11 in a direction parallel to the floor, the pair of inner walls being formed in a direction perpendicular to the floor.

In this case, a space may be formed with a predetermined interval between the pair of rail frames 12 facing each other. The spring guide 50 to be described later may be disposed in the above space. The wheels 23 of the upper rail 20 may roll on the upper surface of the rail frame 12. That is, the rail frame 12 may provide a surface which the wheels 23 are in contact with and rolls on.

Meanwhile, the lower surface of the rail frame 12 may be in contact with the spring guide 50 to be described later. For example, the lower surface of the rail frame 12 may be in contact with a rail support of the spring guide 50.

Accordingly, the rail frame 12 may be supported by the spring guide 50 and may support the wheels 23.

The guide fixing groove 13 may be internally formed in the lower surface of the lower rail body 11, and the spring guide 50 to be described later may be accommodated in the guide fixing groove 13. For example, the guide fixing groove 13 may be formed in a such a manner that the lower rail body 11 is recessed toward the ground. The width of the guide fixing groove 13 may be formed to correspond to the width of the lower surface of the spring guide 50. Therefore, the spring guide 50 may be fitted into and supported in the guide fixing groove 13.

The floor fixing portion 14 may protrude and extend from the outer surface of the lower rail body 11. For example, the floor fixing portion 14 may extend outward from the lower portion of the outer surface of the lower rail body 11, and may extend in a direction parallel to the floor (not shown).

Therefore, when the lower rail body 11 is buried in the floor, the floor fixing portion 14 may be disposed to face the lower side of the floor. In this case, the floor fixing portion 14 may be fixedly coupled to the floor through a member such as a bolt.

The floor support portion 15 may protrude and extend from the outer surface of the lower rail body 11. For example, the floor support portion 15 may extend outward from an upper portion of the outer surface of the lower rail body 11.

Accordingly, when the lower rail body 11 is buried in the floor, the floor support portion 15 may be disposed to face the upper side of the floor. Therefore, when the lower rail body 11 is buried in the floor, the floor may be supported by being fitted between the floor fixing portion 14 and the floor support portion 15.

The upper rail 20 may be fixed to a seat (not shown) of the vehicle and may be coupled to the lower rail 10 so as to be slidably movable.

The upper rail 20 may include a seat coupling portion 21, the connection portion 22, and the wheels 23. In this case, the connection portion 22 may be coupled to the lower side of the seat coupling portion 21, and the connection portion 22 may be coupled with a pair of wheels 23. In this case, the connection portion 22 may pass through a space formed on the upper side of the lower rail body 11 and may be disposed at least in part in the inner space of the lower rail body 11. In addition, the pair of wheels 23 may be disposed in the inner space of the lower rail body 11 to roll along the rail frame 12.

The seat (not shown) of a vehicle may be coupled to the upper side of the seat coupling portion 21. Also, the connection portion 22 may be coupled to the lower side of the seat coupling portion 21. Therefore, when the seat is moved, the seat coupling portion 21 and the connection portion 22 may be moved together.

Meanwhile, a locking device may be disposed in the seat coupling portion 21. The locking device may fix the position of the upper rail with respect to the lower rail. Therefore, the position of the seat may be fixed by the locking device.

The connection portion 22 may connect the seat coupling portion 21 and the wheels 23. For example, the connection portion 22 may include a pair of plates, and portions of the pair of plates may overlap and contact each other. In this case, the overlapping portions may be arranged in a direction perpendicular to the ground, and the upper and lower portions of the pair of plates with respect to the overlapping portions may be bent in a direction away from each other. In addition, the bent lower portions may be bent once again and arranged in a direction perpendicular to the ground. Accordingly, the connection portion 22 may have two lower portions in the form of a pair of plates arranged side by side and spaced apart each other.

Here, the upper portion of the connection portion 22 may be coupled to the seat coupling portion 21 to support the seat coupling portion 21. In addition, a pair of wheels 23 may be respectively coupled to the lower portions of the connection portion 22 arranged side by side and spaced part from each other.

On the other hand, the connection bracket 40 to be described later may be fixedly coupled to the lower portions of the connection portion 22.

One end of the restoring spring 30 in the longitudinal direction is fixedly coupled to the lower rail 10. The other end of the restoring spring 30 is coupled to the connection bracket 40 and moved together with the upper rail 20, and as the upper rail 20 moves, may provide a restoring force to the upper rail 20. For example, the restoring spring 30 may be a coil spring.

On the other hand, in an SUV or van type vehicle, a long rail is mounted to seats in the second row to secure a large amount of forward and backward movement, thereby enabling more diverse seat position adjustments.

However, in the case of a long rail type seat as in the present disclosure, when the rail protrudes above the floor, an occupant's foot may be caught on the rail and may deteriorate interior design. In order to solve this problem, the lower rail needs to be deeply buried in the floor, but when the lower rail is buried in the floor, there is no space for coupling a restoring spring to the lower rail, causing limitation in performing a walk-in function.

To solve the above problem, in the present disclosure, the restoring spring 30 may be accommodated inside the lower rail 10. Also, the restoring spring 30 may be accommodated inside the spring guide 50.

Therefore, even when the lower rail 10 is buried in the floor, the restoring spring 30 may be coupled to the lower rail 10, and when the lower rail 10 is coupled to the upper rail 20, the volume is minimized.

The restoring spring 30 may be compressed as the seat is moved rearward with respect to position P1 where the seat is most forwardly moved.

In this case, the compression length of the restoring spring 30 is increased in proportion to the distance the seat moves rearward, and thus the restoring force generated by the restoring spring 30 also increases. For example, the restoring force of the restoring spring 30 at position P3 where the seat is most rearwardly moved is greater than the restoring force of the restoring spring 30 at position P2 where the occupant is sitting.

The connection bracket 40 may couple the restoring spring 30 to the upper rail 20.

At least a portion of the connection bracket 40 may be disposed between the pair of rail frames 12.

The connection bracket 40 may be coupled to the restoring spring 30 to receive the restoring force of the restoring spring 30, and may be fixedly coupled to the upper rail 20 to transfer the restoring force of the restoring spring 30 to the upper rail 20. In addition, the connection bracket 40 may press or pull the restoring spring 30 when the seat is moved.

The connection bracket 40 may be accommodated inside the lower rail 10. In addition, the connection bracket 40 may be at least partially accommodated inside the spring guide 50.

The connection bracket 40 may include a piston portion 41 and a rail coupling portion 42.

The piston portion 41 may come into contact with one end of the restoring spring 30 in the longitudinal direction. The piston portion 41 may be coupled to one end of the restoring spring 30 in the longitudinal direction. For example, the piston portion 41 may be formed in the form of a circular block having a predetermined thickness.

The piston portion 41 may linearly reciprocate in the longitudinal direction of the lower rail 10 inside the lower rail 10. The piston portion 41 may linearly reciprocate in the longitudinal direction of the spring guide 50 inside the spring guide 50.

With this configuration, the piston portion 41 may linearly reciprocate inside the spring guide 50 by receiving the restoring force of the restoring spring 30.

The rail coupling portion 42 may be connected to the piston portion 41 and fixedly coupled to the upper rail 20. Specifically, the rail coupling portion 42 is connected to the upper side of the piston portion 41 and moved together with the piston portion 41, and may be fixedly coupled to the connection portion 22 of the upper rail 20.

With this configuration, when the restoring force of the restoring spring 30 is applied to the piston portion 41, the upper rail 20 is moved while the rail coupling portion 42 is moved together with the piston portion 41. In addition, when the upper rail 20 is moved according to the movement of the seat, the piston portion 41 may be moved.

The spring guide 50 may be coupled to the inside of the lower rail 10 and may accommodate the connection bracket 40 therein.

The spring guide 50 may include a guide body 51, a base portion 52, a rail support 53, and a bracket pass-through portion 54.

The guide body 51 is accommodated in the inside of the lower rail 10 and may accommodate the piston portion 41 such that the piston portion 41 is able to linearly reciprocate in the guide body 51. For example, the guide body 51 is formed similarly to a cylindrical shape with one side open, and may be arranged in a direction parallel to the floor. In this case, at least a part of the guide body 51 may be disposed between the pair of rail frames 12 and may be disposed closer to the ground than the pair of rail frames 12.

The base portion 52 may extend radially outward from the outer periphery surface of the guide body 51. In this case, the base portion 52 may be formed to have a flat lower surface. That is, the base portion 52 may provide a flat surface supporting the guide body 51.

The base portion 52 may be accommodated in the guide fixing groove 13 of the lower rail 10. In this case, the base portion 52 may be formed to have a width equal to or slightly larger than the width of the guide fixing groove 13. Thus, the base portion 52 may be supported by being fitted into the guide fixing groove 13.

The rail support 53 may extend radially outward from the outer periphery surface of the guide body 51. In this case, the base portion 52 may be disposed at a higher position than the base portion 52 with respect to the ground. Furthermore, the height in the vertical direction from the lowermost end of the base portion 52 to the uppermost end of the rail support 53 is equal to or slightly larger than the height from the upper surface of the guide fixing groove 13 to the lower surface of the rail frame 12.

With this configuration, the rail support 53 may support the rail frame 12 while the spring guide 50 is fitted between the rail frame 12 and the guide fixing groove 13.

The bracket pass-through portion 54 may be formed on the upper portion of the guide body 51 and pass through the rail coupling portion 42 of the connection bracket. For example, the bracket pass-through portion 54 may be a hole formed in the length direction of the guide body 51. Accordingly, when the rail coupling portion 42 is moved, the bracket pass-through portion 54 may prevent the rail coupling portion 42 from shaking.

FIG. 8 illustrates a front view for describing a vehicle seat rail according to another embodiment of the present disclosure.

In order to avoid redundant description, the vehicle seat rail of FIG. 8 has the same structure and effect as the vehicle seat rail according to an embodiment of the present disclosure described above except for those specifically described in the present embodiment, and the description given above may be applied.

In the vehicle seat rail 1' according to the present embodiment, a lower rail (not shown) is formed inside a lower rail body 11' and may include a spring guide groove 13' configured to movably accommodate the connection bracket 40 and the restoring spring 30.

Unlike the vehicle seat rail 1 according to an embodiment of the present disclosure, in the vehicle seat rail 1' according to the present embodiment, the spring guide groove 13' that directly accommodates the connection bracket 40 and the restoring spring 30 is formed inside the lower rail body 11' without separately including the spring guide 50 coupled between the rail frames 12 and the guide fixing groove 13.

The spring guide groove 13' may protrude upward from the inner surface of the lower portion of the lower rail body 11'. In this case, a pair of spring guide grooves 13' may diverge from the center of the lower portion of the lower rail body 11' to extend upward in an arc shape. In addition, the spring guide grooves 13' may be connected to rail frames 12' respectively protruding inward from the left and right side surfaces of the lower rail body 11'.

Accordingly, the spring guide groove 13' capable of accommodating the cylinder-like piston portion 41 and the restoring spring 30 in the longitudinal direction may be formed in the inside of the lower rail body 11'.

Therefore, according to the present embodiment, it is possible to accommodate the connection bracket 40 and the restoring spring 30 without the separate spring guide 50.

Although the present disclosure has been described in detail through specific embodiments, it is intended to describe the present disclosure in detail, and the present disclosure is not limited thereto. It is apparent that the present disclosure can be modified or improved by those skilled in the art within the technical spirit of the present disclosure.

All simple modifications or changes of the present disclosure fall within the scope of the present disclosure, and the specific scope of protection of the present disclosure will be made apparent by the appended claims.

| REFERENCE NUMERALS | |
| --- | --- |
| 1: Seat rail | 10: Lower rail |
| 11: Lower rail body | 12: Rail frame |
| 13: Guide fixing groove | 14: Floor fixing portion |
| 15: Floor support portion | 20: Upper rail |
| 21: Seat coupling portion | 22: Connection portion |
| 23: Wheel | 30: Restoring spring |
| 40: Connection bracket | 41: Piston portion |
| 42: Rail coupling portion | 50: Spring guide |

What is claimed is:

1. A vehicle seat rail comprising:
a lower rail configured to be fixed to a bottom of a vehicle;
an upper rail configured to be fixed to a seat at an upper portion thereof, the upper rail coupled to the lower rail to be slidably movable;
a connection bracket coupled to the upper rail;
a restoring spring having a first end fixedly coupled to the lower rail in a longitudinal direction and a second end coupled to the connection bracket, the restoring spring configured to provide a restoring force to the upper rail; and
a spring guide disposed in an inside space of the lower rail, the spring guide configured to accommodate the connection bracket,
wherein the lower rail comprises:
a lower rail body having opposing walls;

a first rail frame protruding from an inner surface of a first wall of the opposing walls; and
a second rail frame protruding from an inner surface of a second wall of the opposing walls toward the first rail frame,
wherein the lower rail is configured to accommodate the spring guide, the restoring spring and the connection bracket therein, and
wherein the spring guide is in contact with the first rail frame and the second rail frame.

2. The vehicle seat rail of claim 1, wherein the lower rail body of the lower rail is hollow, and wherein at least a portion of the connection bracket is disposed between the first rail frame and the second rail frame.

3. The vehicle seat rail of claim 1, wherein the connection bracket comprises:
a piston portion in contact with the second end of the restoring spring in the longitudinal direction; and
a rail coupling portion connected to the piston portion and fixedly coupled to the upper rail.

4. The vehicle seat rail of claim 3, wherein the spring guide comprises:
a guide body that accommodates the piston portion such that the piston portion is able to linearly reciprocate therein; and
a bracket pass-through portion configured to be formed on an upper portion of the guide body as a space extending in a length direction of the guide body to allow the rail coupling portion to pass therethrough.

5. The vehicle seat rail of claim 1, wherein the spring guide includes a guide body and a rail support, the rail support being disposed below one of the first rail frame or the second rail frame and in contact with the one of the first rail frame or the second rail frame.

6. The vehicle seat rail of claim 1, wherein the lower rail body of the lower rail includes a guide fixing groove, and wherein the spring guide includes a base portion disposed within the guide fixing groove.

7. The vehicle seat rail of claim 1, wherein the upper rail includes wheels disposed on opposing sides of the upper rail, the wheels being in contact with an upper surface of the first rail frame and an upper surface of the second rail frame.

\* \* \* \* \*